United States Patent Office 2,944,785
Patented July 12, 1960

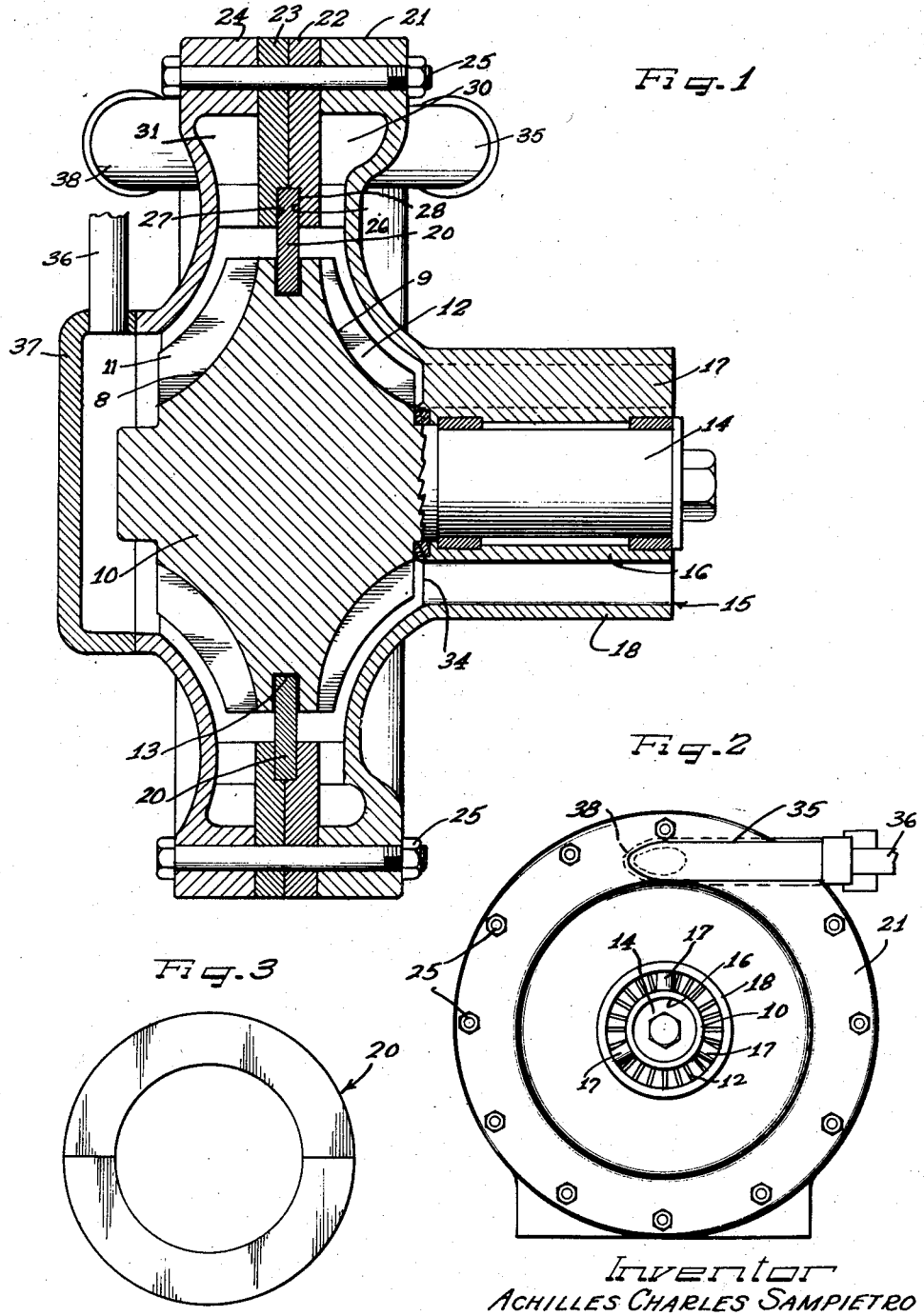

2,944,785
IMPELLER FOR TURBINE ENGINE AND THE LIKE

Achilles Charles Sampietro, Ann Arbor, Mich., assignor to Thompson Ramo Wooldridge Inc., a corporation of Ohio Filed May 18, 1955, Ser. No. 509,266

10 Claims. (Cl. 253—48)

This invention relates to a dual rotary fluid impeller of low cost construction and which especially lends itself for use in different applications, such as in compressors, turbines, superchargers and the like.

In mounting fluid impellers or rotors, such as in a multi-stage compressor, back-to-back in dual low and high pressure chambers, I have found that it is possible to employ a dividing baffle or ring between the chambers around which leakage may occur from the high pressure chamber to the low pressure chamber. With the only shaft seal being on the low pressure side, external leakage can take place only at a point where the pressure differential between the unit and the outside atmosphere is the least. Leakage from the high pressure side is a function only of the pressure differential between the high and low pressure sides across the dividing baffle.

The principal advantage of this construction is to eliminate the possibility of a leakage path at a point where high leakage rate could take place. It is obvious that if the high pressure side is on the shaft or shaft seal side, the pressure differential across the seal is much higher than it would be if the shaft side was the low pressure side.

If we accept the fact that a certain amount of leakage is inevitable across any mechanical seal, it is apparent that the design must be such that the pressure differential across the seal is a minimum. According to this invention, gases that are on the high pressure side (opposite to the shaft) cannot leak to the outside atmosphere but rather can leak only to the low pressure side, therefore, the baffle or seal ring makes it possible for the inevitable leakage that will take place from the high pressure side to exist where the pressure differential is a minimum. The highest pressure in the entire assembly is at the periphery of the high pressure impeller while the next highest pressure in the assembly is at the periphery of the low pressure impeller; therefore, for highest efficiency any leakage that will take place from the high pressure side should go across the baffle to the periphery of the low pressure impeller.

An object of this invention, therefore, is to provide an improved and simplified form of fluid impeller or turbine.

Another object of this invention is to provide a dual chamber fluid impeller or turbine of such construction that the component parts defining the chambers of the device may be readily assembled by a mere bolting together of the housing parts or sections.

In accordance with the general features of this invention, there is provided in a fluid impeller, a rotor having opposed vaned faces and a peripheral groove, a ring in the groove, inner opposed housing sections embracing the peripheral margin of the ring to hold the same in position in the groove and so that the rotor may turn relative to the same, outer opposed housing sections each cooperating with an inner section to define a fluid impelling chamber in which the vanes on one side of the rotor revolves and means for securing all four housing sections together and to clamp the ring between the inner sections.

A still further feature of the invention relates to providing the inner housing sections of the foregoing structure with mating halves of radially inwardly opening grooves in which the peripheral margin of the baffle ring is clamped between the inner housing sections and so as to project with a loose fit in the rotor groove.

Other objects and features of this invention will more fully appear from the following detailed description taken in connection with the accompanying drawings which illustrate a single embodiment thereof, and in which:

Figure 1 is a fragmentary vertical sectional view through an impeller or rotor of my invention;

Figure 2 is a side elevational view of Figure 1 taken from the right-hand side of Figure 1; and Figure 3 is a side view of the two-piece dividing baffle or ring.

As shown on the drawings:

At the outset, it should be noted that while the following described and illustrated embodiment of the invention is especially adapted for use in a multi-stage compressor, the invention could, with equal advantage, be used in other applications involving the impelling of fluid by a dual rotor.

In the illustrated embodiment, the reference character 10 designates generally a dual rotor which may be made from any suitable material, such, for example, as a single forging or a precision casting. The rotor 10 has opposite converging vaned faces 8 and 9, the vanes 11 and 12 of which may be of any suitable or conventional construction.

The outer periphery of the rotor 10 has an annular groove or grooved area 13 through which the medial plane of the rotor passes between the converging vaned surfaces 11 and 12. The grooved area 13 is carried by an intermediate annular impeller section separating the axially spaced sets of blades or vanes 11 and 12.

The rotor 10 includes a shaft portion 14 journalled in a spider type seal bearing or impeller support and bearing structure 15 through which fluid can flow. In other words, the bearing 15 includes a central ring 16, spaced radial webs 17 and outer ring 18. The two concentric rings 16 and 18 define a fluid conduit between them communicating with the right-hand impelling chamber which will be described more in detail hereinafter.

The peripheral groove 13 of the rotor is machined to loosely receive a segmental baffle ring or baffle ring structure 20. This ring may comprise two or more segments as shown in Figure 3 so as to enable assembly in the groove 13.

Now, the housing of the compressor is made up of a series of four annular axially opposed housing sections 21, 22, 23 and 24 clamped together by an annular series of spaced bolts and nuts 25. The two innermost housing sections 22 and 23 have mating halves 26 and 27 of a radially inwardly opening groove 28 which snugly and tightly receives the outer peripheral margin of the baffle ring 20. Thus, by the act of clamping the housing sections together, it is possible also to firmly secure in position the ring 20 with its inner peripheral margin projecting into the rotor groove 13.

Since the inner margin of the ring 20 has a loose fit in the rotor groove 13, the rotation of the rotor is not interfered with and at the same time leakage of fluid through the groove 13 can occur although not necessarily so.

The two outer housing sections 21 and 24, when clamped together, cooperate with the inner sections to define impeller chambers 30 and 31; that is to say, the outer section 21 cooperates with inner section 22 to define a low pressure chamber 30, and outer section 24 cooperates with inner section 23 to define a high pressure chamber 31.

The right-hand or low pressure chamber 30 in which the vanes 9 turn has an inlet 34 in communication with the interior of the seal or bearing member 15. It will be appreciated that the interior of the bearing member may be connected to any suitable conduit (not shown) in any conventional manner.

The low pressure chamber 30 has a tangential discharge outlet 35 connected by a conduit 36 (Figure 2) leading into the high pressure chamber 31 (Figure 1). The section 24 has a dished cap 37 affixed thereto providing a fluid-tight closure at the downstream high pressure end of the housing. Thus, the fluid impelled from the low pressure chamber 30 is conducted to the center of high pressure chamber 31 where it is impelled centrifugally outwardly by the left-hand vanes 11 on the rotor 10.

The high pressure fluid from the chamber 31 may likewise be discharged tangentially therefrom through any suitable conduit 38 shown in Figure 1 and illustrated by dotted lines in Figure 2.

As noted before, the highest pressure in the rotor assembly is at the periphery of the high pressure chamber 31 and if any leakage should occur it would take place through the baffle ring groove 13 into the low pressure impeller chamber 30. Necessarily, such leakage is therefore a function only of the pressure differential between the high and low pressure sides across the dividing baffle. The likelihood, therefore, of leakage at the bearing seal 15 is substantially obviated since the high pressure chamber 31 can only leak to the low pressure chamber and not to the ambient.

The foregoing multi-section housing structure, due to it being a stack type of assembly and the simple one-piece dual rotor enables a very cheap and economical fluid impeller or compressor structure.

I claim as my invention:

1. In a fluid impeller structure, a rotor having opposed vaned faces and a peripheral groove, a baffle ring in said groove, a housing having a fluid-tight closed high pressure end and comprised of inner and outer opposed sections, the inner opposed housing sections embracing the peripheral margin of said ring to hold same in position in said groove and so that said rotor may turn relative to the same, the outer opposed housing sections each cooperating with an inner section to define a fluid impelling chamber in which the vanes on one side of said rotor revolve and means for securing all four housing sections together and to clamp the ring between the inner sections, said inner sections defining mating halves of a radially inwardly opening groove in which the peripheral margin of said ring is clamped between said inner sections and so as to project with a loose fit in said rotor groove to afford a fluid leakage path in the event of leakage between the chambers.

2. In a fluid impeller structure, a rotor having opposed vaned faces and a peripheral groove, a baffle ring in said groove, a housing having a fluid-tight closed high pressure end and comprised of inner and outer opposed sections, the inner opposed means in said housing embracing the peripheral margin of said ring to hold same in position in said groove and so that said rotor may turn relative to same, said housing having outer opposed housing sections each at least partially defining a fluid impelling chamber in which the vanes on one side of said rotor revolve and means for securing said housing sections together with said ring held in said rotor groove, said vanes on said rotor converging toward and on opposite sides of said peripheral groove in the rotor, one of said chambers comprising a low pressure stage chamber and the other of said chambers comprising a high pressure stage chamber, said ring being spaced from the wall of the rotor groove to afford a leakage path from the high pressure stage chamber to the low pressure stage chamber in the event of leakage between the chambers.

3. In a fluid impeller structure, a rotor having opposed vaned faces and a peripheral groove, a baffle ring in said groove, a housing having a fluid-tight closed high pressure end and comprised of inner and outer opposed sections, the opposed housing sections embracing the peripheral margin of said ring to hold same in position in said groove and so that said rotor may turn relative to same, the outer opposed housing sections each cooperating with an inner section to define a fluid impelling chamber in which the vanes on one side of said rotor revolve and means for securing all four housing sections together and to clamp the ring between the inner sections, said ring comprising a plurality of segments coacting to make a continuous annular ring and having a leakage allowing fit in said rotor groove.

4. In a fluid impeller structure, a rotor having opposed vaned faces and a peripheral groove, a baffle ring in said groove, a housing having a fluid-tight closed high pressure end and comprised of inner and outer opposed sections, the inner opposed housing sections embracing the peripheral margin of said ring to hold same in position in said groove and so that said rotor may turn relative to same, the outer opposed housing sections each cooperating with an inner section to define a fluid impelling chamber in which the vane on one side of said rotor revolve and means for securing all four housing sections together and to clamp the ring between the inner sections, said inner sections defining mating halves of a radially inwardly opening groove in which the peripheral margin of said ring is clamped between said inner sections and so as to project with a loose fit in said rotor groove, said ring comprising a plurality of arcuate segments arranged end to end to form a continuous annulus and being of substantially rectangular cross-section with one squared edge secured between the inner housing sections and the other squared edge projecting into said rotor groove.

5. In a fluid impeller structure, a rotor having opposed vaned faces and a peripheral groove, a baffle ring in said groove, a housing having a fluid-tight closed high pressure end and comprised of inner and outer opposed sections, the inner opposed housing sections embracing the peripheral margin of said ring to hold same in position in said groove and so that said rotor may turn relative to same, the outer opposed housing sections each cooperating with an inner section to define a fluid impelling chamber in which the vanes on one side of said rotor revolve and means for securing all four housing sections together and to clamp the ring between the inner sections, one of said chambers comprising a low pressure stage chamber and the other of said chambers comprising a high pressure stage chamber, said ring being spaced from the wall of the rotor groove to afford a leakage path from the high pressure stage chamber to the low pressure stage chamber in the event of leakage between the chambers.

6. In a fluid impeller structure, a rotor having opposed vaned faces and a peripheral groove, a baffle ring in said groove, a housing having a fluid-tight closed high pressure end and comprised of inner and outer opposed sections, the inner opposed housing sections embracing the peripheral margin of said ring to hold same in position in said groove and so that said rotor may turn relative to same, the outer opposed housing sections each cooperating with an inner section to define a fluid impelling chamber in which the vanes on one side of said rotor revolve, means for securing all four housing sections together and to clamp the ring between the inner sections, a shaft for said rotor and a bearing seal on said shaft adjoining said sections, the chamber in said sections adjoining said seal being a low pressure fluid chamber and the other and remote chamber being a high pressure chamber, said ring affording a leakage path from the high pressure chamber to the low pressure chamber in the event of fluid leakage between the chambers.

7. In a fluid impeller structure, a rotor having opposed vaned faces and a peripheral groove, a baffle ring in said groove, a housing having a fluid-tight closed high pressure end and comprised of inner and outer opposed sections, the inner opposed housing sections embracing the peripheral margin of said ring to hold the same in position in said groove and so that said rotor may turn relative to same, the outer opposed housing sections each cooperating with an inner section to define a fluid impelling chamber in which the vanes on one side of said rotor revolve, means for securing all four housing sections together and to clamp the ring between the inner sections, a shaft for said rotor and a bearing seal on said shaft adjoining said sections, the chamber in said sections adjoining said seal being a low pressure fluid chamber and the other and remote chamber being a high pressure chamber, said ring affording a leakage path from the high pressure chamber to the low pressure chamber in the event of fluid leakage between the chambers, said ring being composed of a plurality of arcuate segments assembled circumferentially around said rotor in said groove.

8. In a stack-type fluid impeller structure including a one-piece rotor having axially spaced sets of radially extending impeller blades, an intermediate annular impeller section separating the axially spaced sets of blades, a housing having said rotor mounted therein, the spaced sets of blades being rotatable in axially spaced interconnected high and low pressure chambers defined between the housing and the rotor on opposite sides of the annular intermediate impeller section, said housing being comprised of a series of sections disposed in stacked relation centered on the axis of the rotor, means securing said sections in stacked assembly together, said intermediate annular impeller section having an annular grooved area therein, a segmented baffle ring mounted in said grooved area at its radially inner end and clamped between a pair of said sections at its radially outer end, the baffle ring and the grooved area being cooperable together to define a high pressure leakage path beteeen the high and low pressure chambers to reduce fluid leakage to the exterior of the impeller structure.

9. In a stack-type fluid impeller structure including a one-piece rotor having axially spaced sets of radially extending impeller blades, an intermediate annular impeller section separating the axially spaced sets of blades, a housing having said rotor mounted therein, the spaced sets of blades being rotatable in axially spaced interconnected high and low pressure chambers defined between the housing and the rotor on opposite sides of the annular intermediate impeller section, said housing being comprised of a series of sections disposed in stacked relation centered on the axis of the rotor, means securing said sections in stacked assembly together, one of said sections having means in assembly therewith enclosing one end of the housing, another of said sections having impeller support and bearing structure in assembly therewith at the opposite end of the housing supporting said impeller in said chambers, and baffle ring structure for establishing a fluid leakage path between the chambers disposed generally at the periphery of the axially spaced sets of blades and being supported and confined between the intermediate annular impeller section separating the sets of blades and said sections.

10. In a fluid impeller structure, a one-piece rotor having axially spaced sets of vanes and a peripheral rotor groove therebetween, a baffle ring in said groove, a housing for the rotor having a fluid-tight closed high pressure end as well as having outer opposed housing sections, means connected to said outer opposed housing sections embracing the peripheral margin of said ring to hold the ring in position in said groove and so that the rotor may turn relative to the ring, each of the outer opposed housing sections being cooperable with one set of vanes on one side of the rotor whereby a fluid impelling chamber is provided on each side of the ring in which the vanes on each side of said rotor revolve, and means for securing said housing sections together with said ring held in said rotor groove, one of said chambers comprising a low pressure stage chamber and the other of said chambers comprising a high pressure stage chamber, a loose fit being provided between said ring and the wall of the rotor groove to afford a leakage path from the high pressure stage chamber to the low pressure stage chamber.

References Cited in the file of this patent

UNITED STATES PATENTS

| | | |
|---|---|---|
| 868,653 | Goldsborough | Oct. 22, 1907 |
| 1,229,274 | Jack | June 12, 1917 |
| 1,309,282 | Frame | July 8, 1919 |
| 2,127,985 | Philpott | Aug. 25, 1938 |
| 2,668,501 | Lutz | Feb. 9, 1954 |
| 2,768,808 | Worre | Oct. 30, 1956 |

FOREIGN PATENTS

| | | |
|---|---|---|
| 20,644 | Great Britain | of 1906 |
| 208,397 | Germany | May 1, 1908 |
| 345,856 | Germany | Dec. 17, 1921 |
| 518,106 | Germany | Feb. 24, 1931 |